(12) United States Patent
Witchie

(10) Patent No.: US 6,988,770 B2
(45) Date of Patent: Jan. 24, 2006

(54) ARRANGEMENT AND METHOD FOR PROVIDING AN AIR FLOW WITHIN AN UPHOLSTERED SEAT

(76) Inventor: Ronald G. Witchie, 15758 Saddle Ridge La. East, Granger, IN (US) 46530

( * ) Notice: Subject to any disclaimer, the term of this patent is extended or adjusted under 35 U.S.C. 154(b) by 57 days.

(21) Appl. No.: 10/703,193

(22) Filed: Nov. 5, 2003

(65) Prior Publication Data

US 2005/0093346 A1    May 5, 2005

Related U.S. Application Data

(60) Provisional application No. 60/423,770, filed on Nov. 5, 2002.

(51) Int. Cl.
*A47C 31/00* (2006.01)
(52) U.S. Cl. .............................. 297/180.14; 297/180.12
(58) Field of Classification Search ............ 297/180.1, 297/180.11, 180.12, 180.13, 180.14, DIG. 6
See application file for complete search history.

(56) References Cited

U.S. PATENT DOCUMENTS

| | | | | |
|---|---|---|---|---|
| 5,023,125 A | * | 6/1991 | Gray | ........................ 428/100 |
| 5,382,075 A | * | 1/1995 | Shih | ...................... 297/180.14 |
| 5,403,065 A | * | 4/1995 | Callerio | ................. 297/180.11 |
| 5,613,729 A | * | 3/1997 | Summer, Jr. | ........... 297/180.11 |
| 5,626,387 A | * | 5/1997 | Yeh | ...................... 297/180.14 |
| 5,692,952 A | * | 12/1997 | Chih-Hung | ................. 454/120 |
| 5,897,162 A | * | 4/1999 | Humes et al. | ......... 297/180.12 |
| 6,189,966 B1 | * | 2/2001 | Faust et al. | ............ 297/180.14 |

\* cited by examiner

*Primary Examiner*—Milton Nelson, Jr.
(74) *Attorney, Agent, or Firm*—John R. Benefiel

(57) ABSTRACT

An arrangement and method for producing an air flow within an upholstered seat back or bottom in which a seat insert has a blower mounted in a pouch at the crotch region between the seat back and bottom and has an outlet which directs air flow up through a spacer layer so as to distribute air flow out through a porous seat back cover or beneath a nonporous cover. A solid plastic backing sheet underlies the spacer layer to direct all air flow out from the spacer layer, the plastic sheet also forming the blower pouch. A mesh layer is bonded to the plastic sheet and used to attach the insert to the seat cushion as well as to carry a heating element pattern extending thereover to also enable electrical heating of the seat back or bottom.

9 Claims, 5 Drawing Sheets

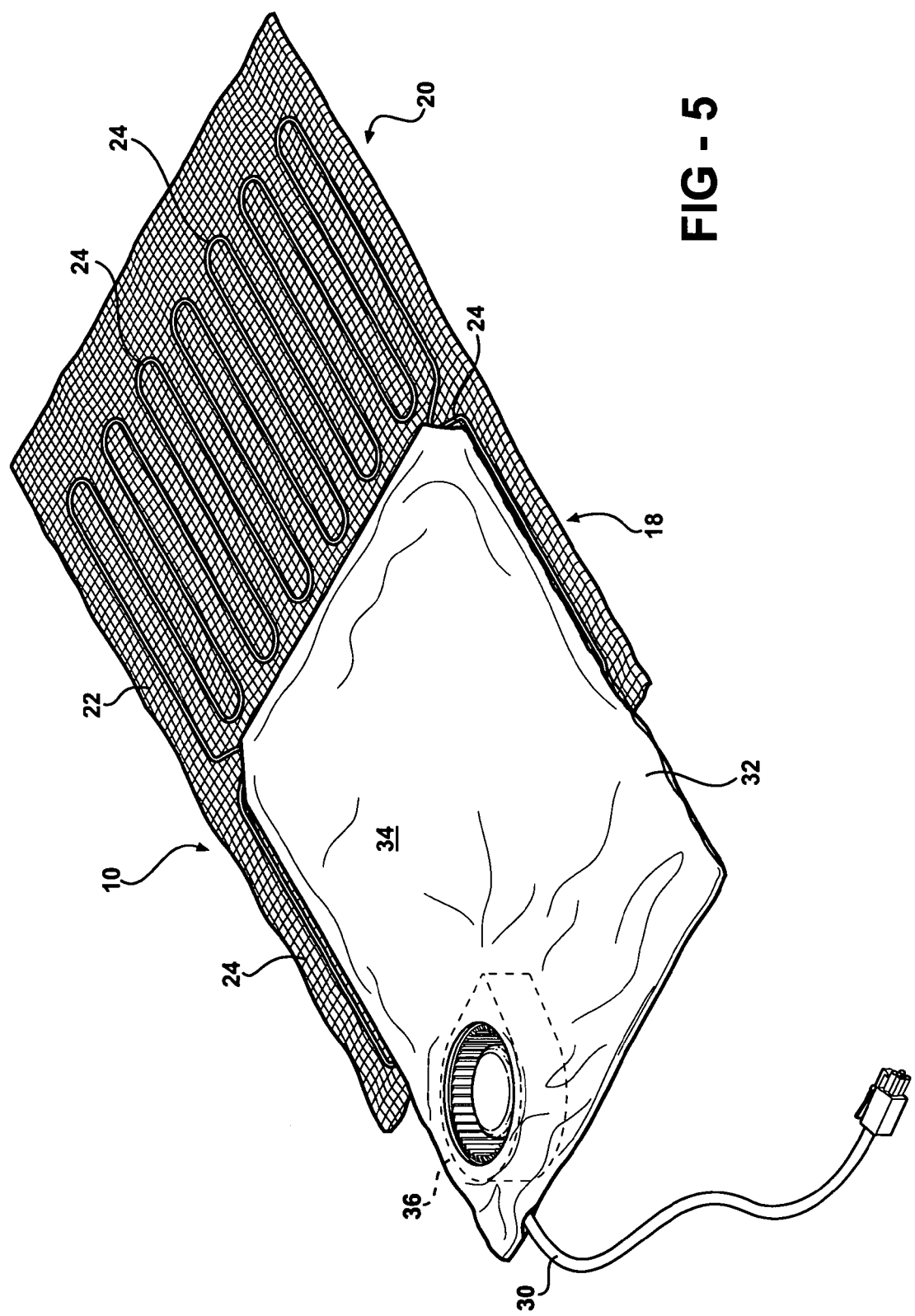

ARRANGEMENT AND METHOD FOR PROVIDING AN AIR FLOW WITHIN AN UPHOLSTERED SEAT

CROSS REFERENCE TO RELATED APPLICATIONS

This application claims the benefit of U.S. provisional Ser. No. 60/423,770, filed Nov. 5, 2002.

BACKGROUND OF THE INVENTION

This invention concerns devices for improving the comfort of a person occupying a seat, particularly suited for upholstered seats.

Seat cooling arrangements have been developed involving air ducting or large plenum cavities carved out within the seat back foam cushion forming the support structure of the seat back (or bottom). This requires considerable labor and compromises the physical integrity of the seat cushion structure. This also makes retrofitting of seats with the cooling device difficult. See U.S. Pat. Nos. 6,059,018; 6,179,706; 6,505,996; 5,385,382; and 3,550,523 for examples of such installations.

Air from the vehicle air conditioning is usually relied on to create seat cooling. The internal ducting is necessary in order to insure a distributed flow of air over most of the area of the seat cushion.

A heating pad or element is required if the capability rapid warming of the seat in cold weather is desired.

It is an object of the present invention to provide a device enabling circulation of air within an automotive seat without the need for removal of substantial portions of the back or bottom seat cushion structure.

It is a further object to provide a device which enables both heating and cooling of a vehicle seat back and/or bottom which is simple and low cost, and can be integrated into a seat without any major modification of the seat cushions.

SUMMARY OF THE INVENTION

The above objects and other objects which will become apparent upon a reading of the following specification and claims are achieved by a seat insert including a mesh layer having a lower section and a solid plastic backing sheet covering the back side thereof, fixed about its perimeter to the mesh layer. A pouch is formed at the bottom of the plastic sheet extending below the mesh layer by a folded up flap of the plastic sheet. The pouch provides a plenum for air flow received from an enclosed small electric blower having an axial inlet aligned with an opening in the back side of the pouch. The bottom edge of the mesh layer is bonded to the upper edge of the flap forming the pouch. A thick layer of an open spacer material such as reticular foam is interposed between the backing section of the plastic sheet and the mesh layer, and the air flow from the blower outlet is directed into the spaces defined in the spacer panel which flows up through the thickness of the spacer layer.

The insert is installed in an upholstered seat back or bottom beneath a seat cover material with the pouch and blower located in the convergent V-shaped space between the seat back and bottom.

A hole is bored through the bottom of the seat back or bottom cushion forming an inlet passage receiving air directed to the blower inlet. The air from the blower outlet preferably flows out through the seat cover from the spacer layer to be distributed across the most of the area of the seat back or bottom.

The air inducted into the inlet passage may be passenger compartment ambient air or cooled air received from a vehicle air conditioner. Warmed air may be inducted when the vehicle heater is in operation.

The spacer layer is preferably soft and cushiony to provide a comfortable support for a person in the seat but resists collapse under the weight of the seated person or when the person leans against the seat back so as to maintain a substantial air flow path for the air from the blower outlet.

The mesh layer is held to the seat cushion by the overlying seat cover which is in turn attached to the cushion by hook and loop fastening strips, an adhesive or other means, all of which are able to penetrate the mesh layer.

The mesh layer also has a serpentine pattern of insulated heating wire or other heating element attached thereto to enable rapid heating of the seat back or bottom when the heater elements are energized.

BRIEF DESCRIPTION OF THE DRAWINGS

FIG. 5 is a rear view of the insert according to the invention.

DETAILED DESCRIPTION

Figure 1:
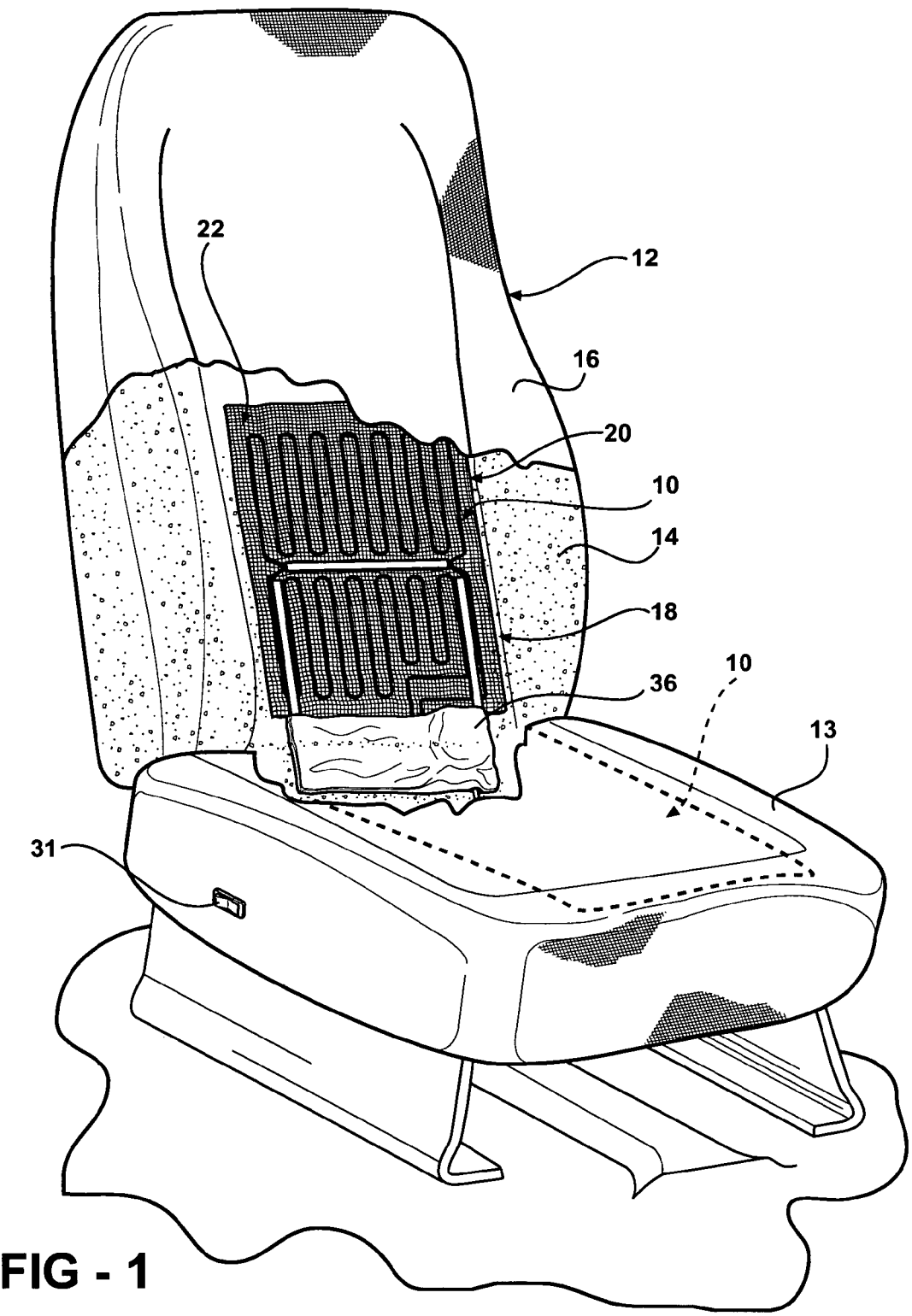
FIG. 1 is a pictorial view of an automotive type seat with the cover layer of the seat back partially broken away to show the seat heating and cooling insert according to the invention.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, the present invention comprises an arrangement for directing an air flow within an upholstered seat such as is used in automotive and other vehicles utilizing a generally rectangular insert 10 configured to be installed in the front of an upholstered seat back 12 beneath a seat cover 16. The insert 10 may also be installed beneath the cover of the upholstered seat bottom 13 in a similar fashion (see FIG. 1A). The insert 10 is positioned with its bottom adjacent the V-shaped space normally found at the convergency between the bottom of the seat back 12 and the rear of the seat bottom 13 the insert 10 extending upwardly somewhat past the mid point of the seat back 12.

The insert 10 overlies the seat back foam cushion 14 and is overlain by the seat cover 16 of the seat back 12 as shown in FIG. 1, and secured by the attachment of the seat cover 16 to the cushion 14, described in detail below.

The insert 10 has two sections, a first section 18 which provides heating or cooling action and a second section 20 which provides only electrical heating.

Figure 2A:
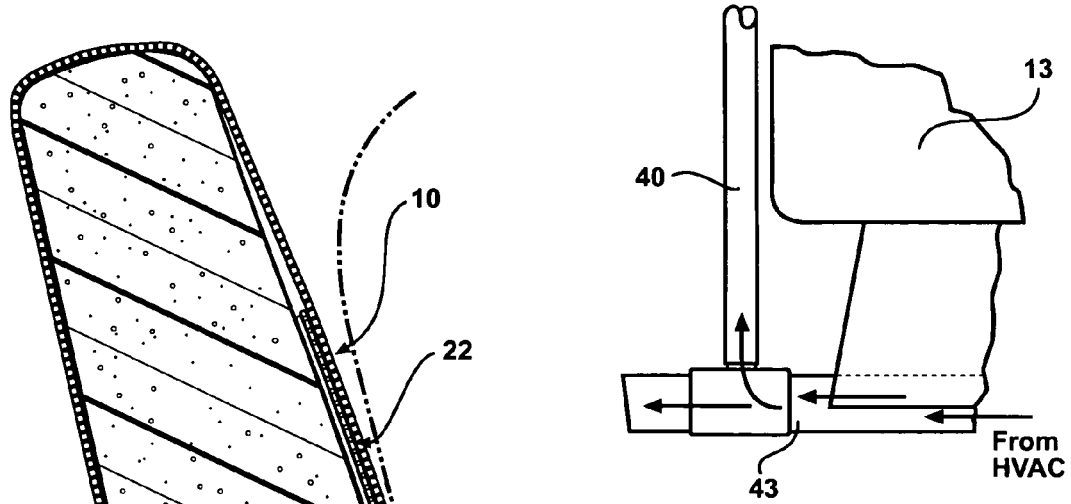
FIG. 2A shows an alternative ducting connection.
Figure 2:
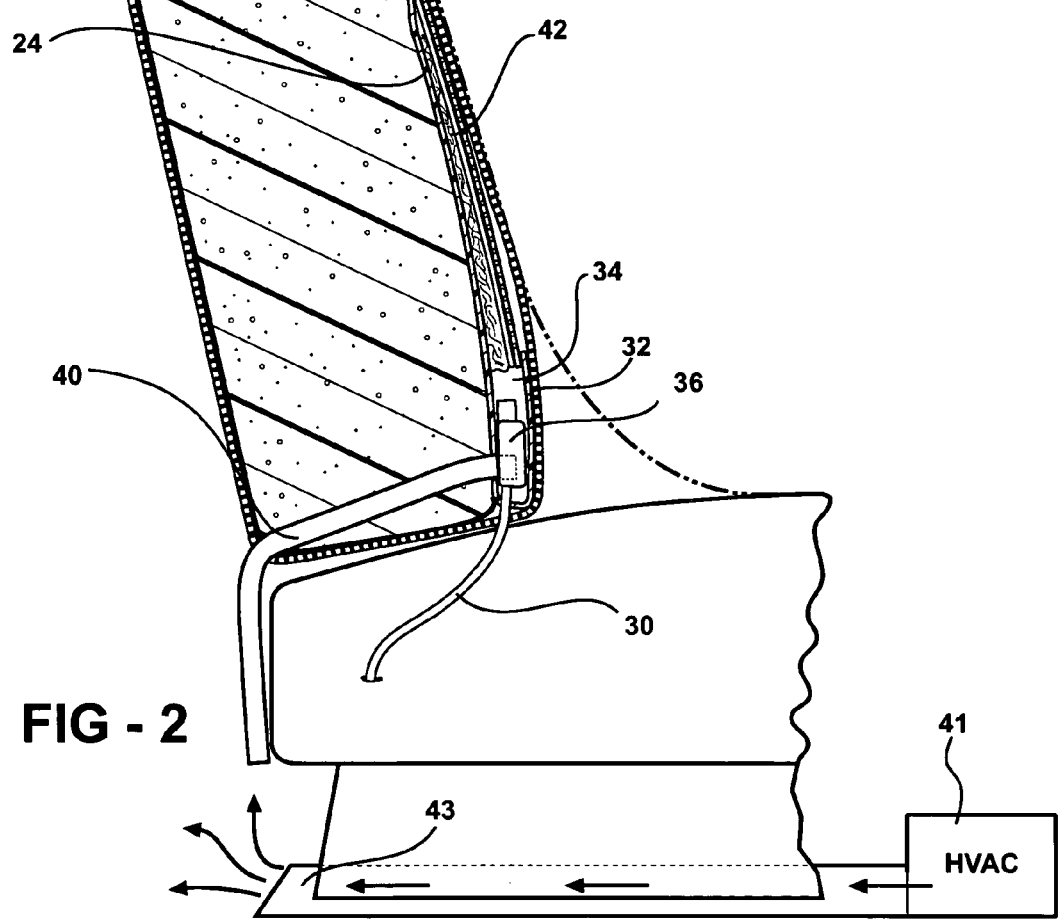
FIG. 2 is a side view of the seat shown in FIG. 1, with the seat back and heating and cooling insert shown in partial section and the seat bottom partially broken away.
Figure 3:
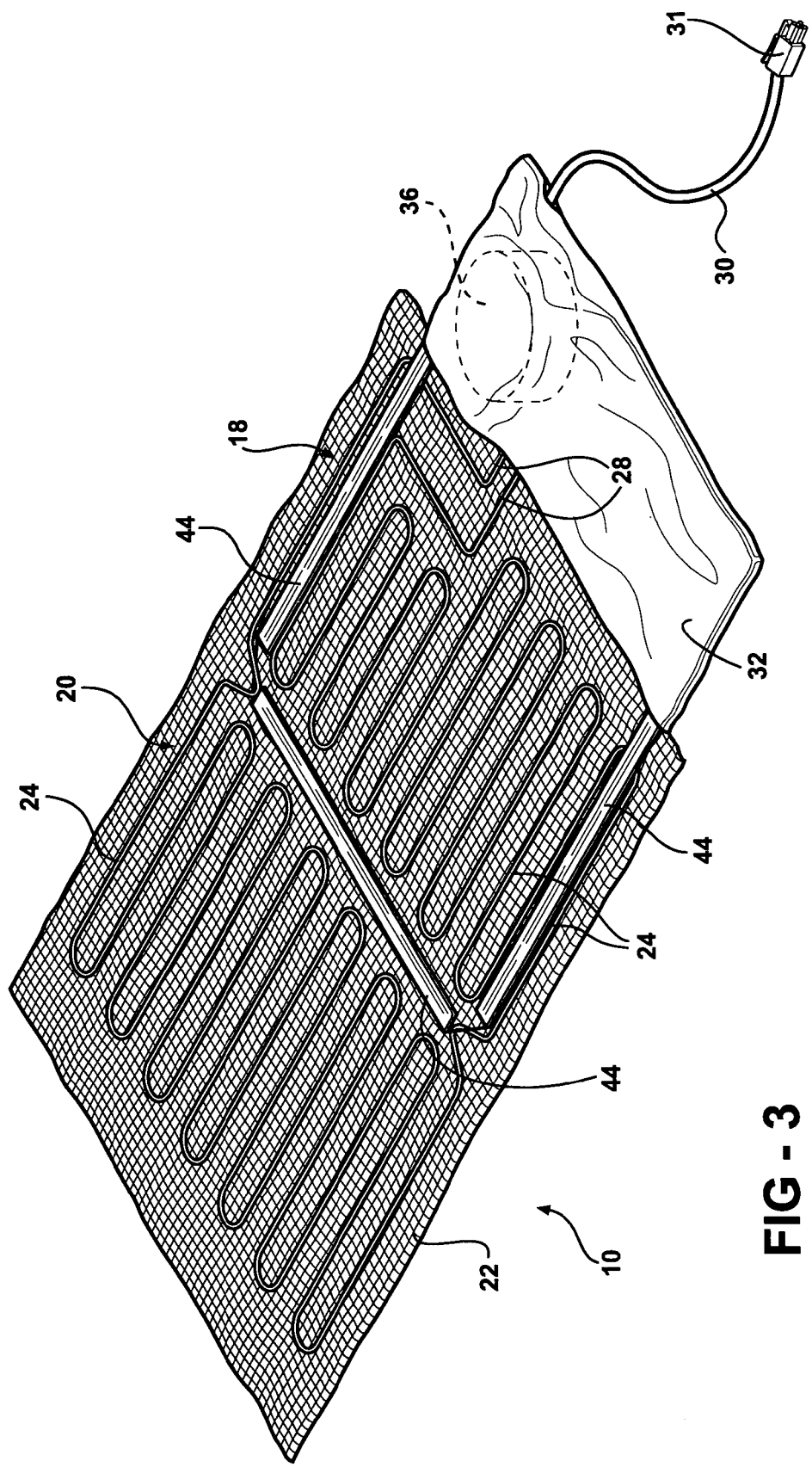
FIG. 3 is a pictorial view of the heating and cooling insert shown in FIGS. 1 and 2.

The insert 10 includes a tough plastic mesh or netting layer 22 extending over both first and second sections 18 and 20. In the region of the lower first section 18, the underside of the mesh layer 22 is backed by a solid plastic sheet 24 (FIG. 2). Vinyl is a suitable material for the plastic sheet 24.

Both sections 18 and 20 of the mesh layer 22 have a heater element comprised of an insulated heater wire 26 tied thereto and extending in serpentine patterns thereon, wire 26 comprising vinyl covered alloy resistance wire. Other electrical heating elements such as carbon fiber which does not require insulation may be employed for the heater element. Electric supply leads 28 are connected thereto extending from a jacketed cable 30 connected to the vehicle electrical system (not shown) via a control switch 31, located for convenient operation, such as on the side of the seat shell as shown, the console, or the dashboard.

The vinyl plastic sheet 24 has a portion which extends below the lower section 18 and a return flap 32 thereof is folded up to form a pouch 34 extending along the bottom edge of the mesh layer 22.

The pouch 34 defines a plenum space for the air outflow received from a small electric blower 36 bonded to the inside surface of the flap 32 and adjacent portions of the sheet 24 to be secured within the pouch 34. The blower 36 has an axial inlet 38 at its center which is aligned with an opening in the sheet 24 (FIG. 5) and communicates with air inlet passage 40 defined by a small (2¼ inch) drilled passage through the seat back foam cushion 14. The passage 40 may merely draw in ambient air from the passenger space or may be connected to the vehicle air conditioning system 41 via ducting to receive cooled (or warmed) air therefrom. A flow of uncooled air itself will cool the seated person by evaporation of any moisture and also by conduction even if a porous seat cover is not used.

Also, the passage 40 may be simply located adjacent to a rear foot outlet 43 from the vehicle air/heat system 41 to induct cooled (or heated) air exiting the duct 43. The blower 36 is powered via electrical leads included in the jacketed cable 30.

The blower 36 is thereby located in the V-shaped space region typically defined at the convergency between the seat bottom 13 and seat back 12 to not be felt by a person occupying the seat.

A soft thick spacer layer 42 is captured between the solid plastic sheet 24 and the mesh layer 22 in the lower section 18. The spacer layer 42 is of an open configuration so as to receive air flow from the peripheral outlet of the blower 36 which is allowed to flow upwardly along the thickness of the spacer layer 42 to allow a distributed outflow therefrom over its entire area and at the same time provides a soft cushiony feel consistent with the seat back 12 (or seat bottom 13).

A preferred material is "reticular foam" which is constructed of a mass of twisting plastic fibers which are stiff enough to resist collapse so as to be able to maintain a substantial air flow volume along its thickness when a person leans his or her back against the seat back 12 (or is seated on the seat bottom 13), but resiliently pliable enough to be soft and cushiony. An adequate thickness of foam (i.e., on the order of one half inch) allows a substantial air flow along the thickness of the layer 24.

An alternative spacer layer (not shown) is an arrangement of lengthwise spaced apart foam strips extending vertically over the inside of the solid sheet 24. The strips could be comprised of integrally formed or extruded ribs or channels to create air flow spaces. Air flow then is allowed to pass between the strips or ribs or within the channels even when a person is pressed against the same.

The solid plastic sheet 24 underlies the spacer layer 42 so as to block air flow from passing back into the seat so as to direct substantially all of the air flow from the blower 36 out through or along the seat cover 16.

The perimeter of the vinyl or other plastic sheet 24 may be heat, RF, or ultrasonically bonded to the mesh layer 22 by strips of plastic 44 placed over the mesh layer 22, and fused to the sheet 24 through the mesh openings. Adhesive bonding or other techniques could also be employed as will be appreciated by one skilled in the art.

Figure 4:
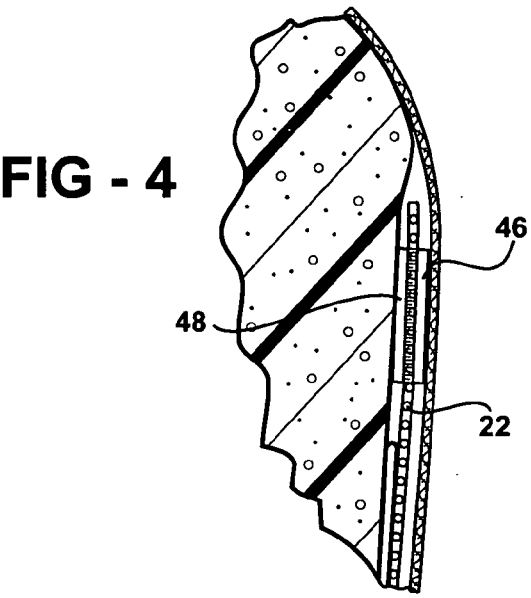
FIG. 4 is an enlarged sectional view of a portion of the seat back and heating and cooling insert showing a method of attachment to the cover.

The mesh layer 22 is attached to the seat by the attachment of the cover 16 to the cushion 14 in a standard fashion, sandwiching the mesh layer 22 therebetween in a manner to secure the insert 10 in position. Seat manufacturers use various attachment techniques in seat construction, and the mesh layer 22 does not interfere and works well with most of these techniques. For example, hook and loop strips 46, 48 elements are often used to attach the cover 16 to the cushion the hooks and loops of which are able to penetrate through the mesh openings (FIG. 4).

Cooled, warmed, or ambient air is directed into the space defined by the reticular foam spacer layer 24 where it is distributed throughout the area thereof. From within the spacer layer 24 the cooled air flow preferably passes out through the cover 16, which could be fabric (or perforated leather) 16 in the complete region of the lower section 18. While porous material is preferred, a solid nonporous seat cover material still creates a cooling (or warming) effect to be achieved by the flow of air through and along the spacer layer 24.

The air flow can be terminated and the heater element 26 (wire) energized by the conveniently located switch 31 which also controls operation of the blower 36.

Figure 1A:
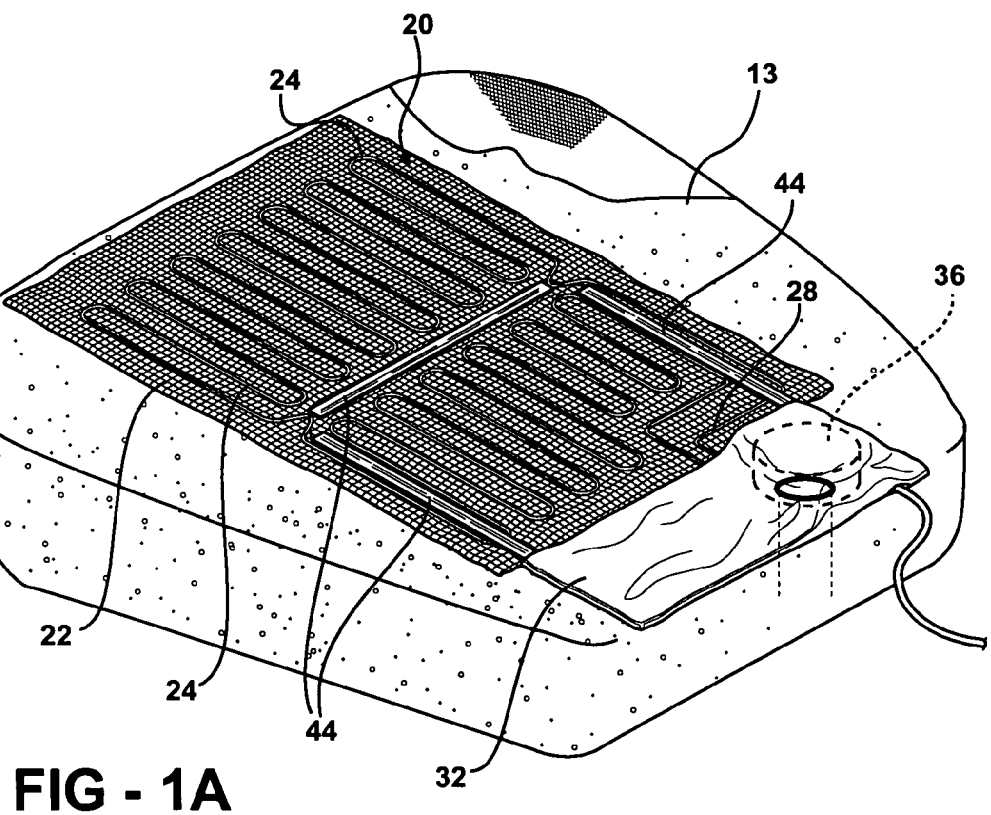
FIG. 1A is a pictorial view of a car seat bottom wish an insert installed therein.

FIG. 1A illustrates an insert 10A installed in a seat bottom. The inserts 10, 10A are identically configured, such that the blowers 36, 36A are advantageously fit together in a complementary relationship in the space at the convergency of the seat back 12 and seat bottom 13. This results from the offset location of the blowers 36, 36A on the inserts 10, 10A.

Accordingly, the invention provides air flow within an upholstered seat, providing cooling or heating for an occupant utilizing a simple to install insert, which arrangement does not require extensive modification of the seat structure to thereby maintain its structural integrity and support for a person seated thereon.

What is claimed is:

1. An arrangement for circulating air within a seat back or seat bottom of an upholstered seat, said arrangement including an insert in combination with said upholstered seat, said insert including:
   a solid plastic backing sheet formed with a pouch at the bottom;
   a blower disposed in said pouch and having an inlet adapted to receive air flow to be directed out through a blower outlet;
   a spacer layer overlaying said plastic sheet above said pouch and being open to be able to distribute air flow from said blower outlet along the thickness thereof;
   said insert disposed beneath a seat cover so that airflow passes out from said spacer layer and out through said seat cover to provide cooling to a person occupying said seat.

2. An arrangement according to claim 1 wherein said blower inlet is arranged to receive cooled air from a vehicle air conditioner when operated.

3. An arrangement according to claim 4 wherein said seat has a cover attached to a foam structure of said seat using hook and loop fastener strips and a perimeter area of said mesh layer is captured between said strips which penetrate said mesh layer.

4. An arrangement according to claim 1 wherein said insert further includes a mesh layer overlying said spacer layer, and said mesh layer is attached to a foam structure included in said seat.

5. An arrangement according to claim 4 wherein said mesh layer extends above said plastic sheet to provide a mesh layer section above said plastic sheet.

6. An arrangement according to claim 5 wherein said mesh layer has a heater element extending in a pattern mounted thereto.

7. An arrangement according to claim 6 wherein said heater element pattern comprises a serpentine pattern held on said mesh layer.

8. An arrangement according to claim 4 wherein said plastic backing sheet is bonded to said mesh layer on a top and two side edges.

9. An arrangement according to claim 1 further including a hole in said seat extending to said blower inlet of said insert.

* * * * *